US008325271B2

(12) United States Patent
Huang et al.

(10) Patent No.: US 8,325,271 B2
(45) Date of Patent: Dec. 4, 2012

(54) METHOD OF FRAME INTERPOLATION FOR FRAME RATE UP-CONVERSION

(75) Inventors: Ling-Hsiu Huang, Tainan County (TW); Fang-Chen Chang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 1575 days.

(21) Appl. No.: 11/761,372

(22) Filed: Jun. 12, 2007

(65) Prior Publication Data

US 2008/0310508 A1 Dec. 18, 2008

(51) Int. Cl.
*H04N 11/20* (2006.01)

(52) U.S. Cl. .......................................... 348/441; 345/87

(58) Field of Classification Search .................. 348/441, 348/459; 345/87
See application file for complete search history.

(56) References Cited

U.S. PATENT DOCUMENTS

2006/0092321 A1 5/2006 Ogino

*Primary Examiner* — Vivek Srivastava
*Assistant Examiner* — Anthony Bantamoi
(74) *Attorney, Agent, or Firm* — Winston Hsu; Scott Margo

(57) ABSTRACT

A method of frame interpolation for frame rate up conversion method is provided. The method includes: determining a first adjusting value and a second adjusting value according to a target pixel in at least one of a first frame and a second frame; determining an interpolated pixel value of the target pixel in an interpolated frame between the first frame and the second frame according to the first adjusting value and a pixel value of the target pixel in one of the first and second frames; and adjusting a pixel value of the target pixel in one of the first and second frames according to the second adjusting value.

1 Claim, 8 Drawing Sheets

METHOD OF FRAME INTERPOLATION FOR FRAME RATE UP-CONVERSION

BACKGROUND OF THE INVENTION

1. Field of the Invention

The present invention relates to image processing, and more particularly, to a method of frame interpolation for frame rate up-conversion.

2. Description of the Prior Art

In order to meet low-bandwidth requirements, video display applications such as video players or mobile video systems have been limited to low frame rates. But from these sources, some image quality issues such as motion blur and flicker can be improved by increasing the frame rate. Therefore, increasing the frame rate by way of a method of frame interpolation for frame rate up-conversion (FRUC)—that is, interpolating an image frame between two original image frames—is a useful method of improving image quality from low frame rate sources.

In the prior art method of frame interpolation for frame rate up-conversion, an interpolated pixel value is directly determined to be the same value as that pixel in the previous frame, or is determined as the average of two pixel values from the two adjacent frames. When the prior method of frame interpolation is applied to an LCD display using the pixel value of a previous frame as an interpolated pixel value, however, it is unable to improve motion blur and flicker artifacts, and also fails to shorten the response time of the LCD. When the prior method of frame interpolation is applied to an LCD display using the average pixel value of two adjacent frames as an interpolated pixel value, however, it is capable of improving motion blur and flicker artifacts but still fails to shorten the response time of the LCD.

Therefore, a novel method of frame interpolation for frame rate up-conversion is required to both improve the motion blur and flicker issues and to shorten the LCD's response time.

SUMMARY OF THE INVENTION

It is an objective of the claimed invention to provide a method for performing frame interpolation for frame rate up-conversion to solve the above-mentioned problems and enhance image quality.

According to one embodiment of the claimed invention, a method of frame interpolation for frame rate up-conversion comprises: determining a first adjusting value and a second adjusting value according to a target pixel in at least one of a first frame and a second frame; determining an interpolated pixel value of the target pixel in an interpolated frame between the first frame and the second frame according to the first adjusting value and a pixel value of the target pixel in one of the first and second frames; and adjusting a pixel value of the target pixel in one of the first and second frames according to the second adjusting value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
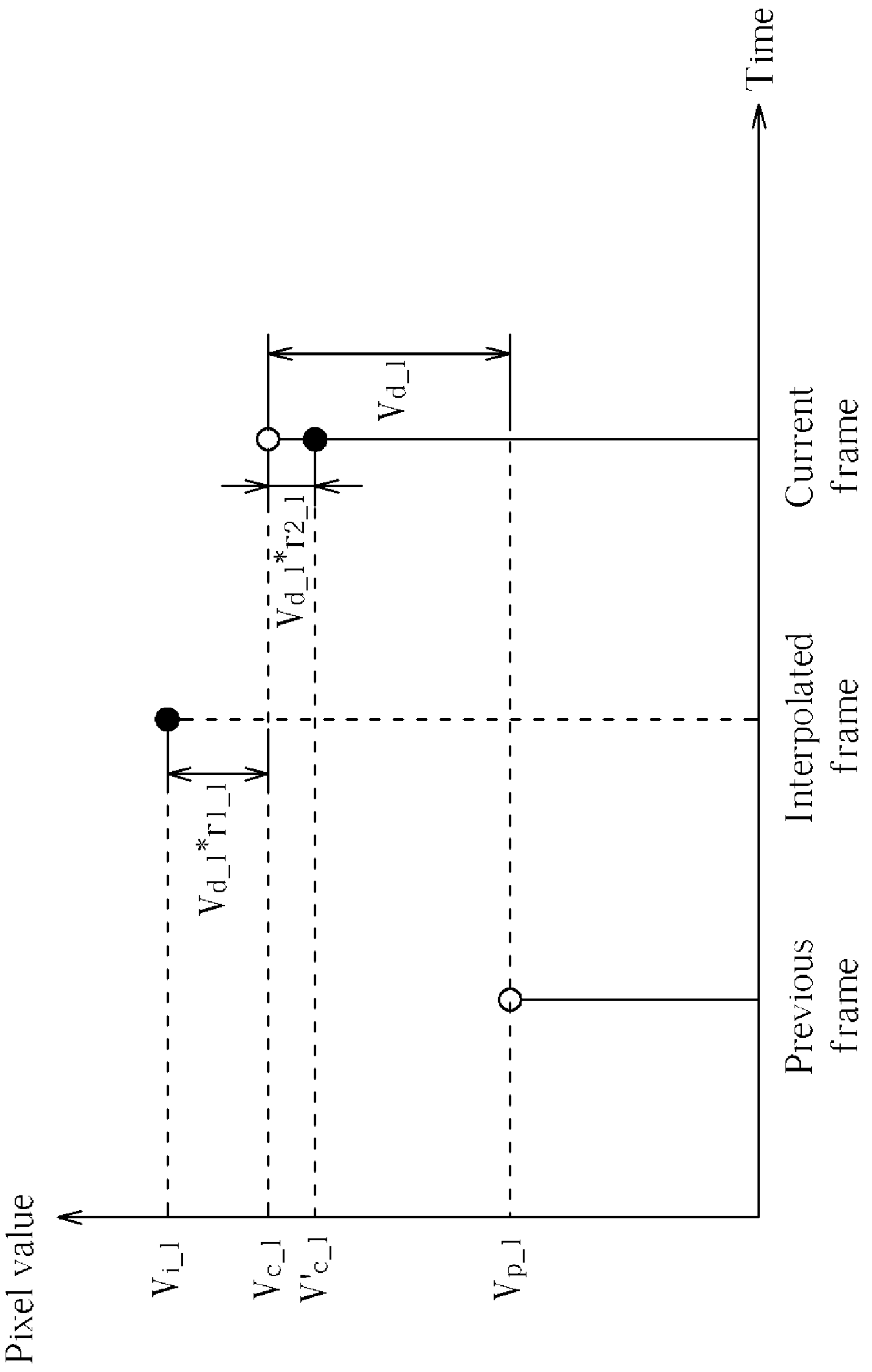
FIG. 1 is a diagram illustrating calculations of the interpolated frame data and the current frame data according to a first embodiment of the present invention.

Please refer to FIG. 1. FIG. 1 is a diagram illustrating calculations of an interpolated pixel value $V_{i\_1}$ and an adjusted pixel value in a current frame $V_{c\_1}'$ according to a first embodiment of the present invention. As shown in FIG. 1 for a given target pixel, the interpolated pixel value $V_{c\_1}$ in an interpolated frame is the sum of a pixel value $V_{c\_1}$ in the current frame and a first adjusting value. Additionally, the first adjusting value is a product of a first scaling factor $r_{1\_1}$ and a pixel value difference $V_{d\_1}$ between the pixel value $V_{c\_1}$ in the current frame and a pixel value $V_{p\_1}$ in a previous frame. The calculation is as follows:

$$V_{i\_1}=V_{c\_1}+(V_{c\_1}-V_{p\_1})*r_{1\_1} \tag{1}$$

As shown in FIG. 1 for the given target pixel, the pixel value $V_{c\_1}$ in the current frame is greater than the pixel value $V_{p\_1}$ in the previous frame, therefore the interpolated pixel value $V_{i\_1}$ is greater than the pixel value $V_{c\_1}$ in the current frame. In this embodiment, the greater interpolated pixel value $V_{i\_1}$ means that the target pixel is operating similar to an LCD overdrive mode. That is, the greater the pixel value difference between the pixel value $V_{p\_1}$ in the previous frame and the interpolated pixel value $V_{i\_1}$, the greater the change in the driving voltage of the target pixel. From this, the liquid crystal in the LCD can rotate more rapidly and lead to a faster response time, and thus LCD motion blur can also be reduced accordingly.

Regarding the given target pixel, however, the above-mentioned interpolated pixel value $V_{i\_1}$ is greater than the pixel value $V_{c\_1}$ in the current frame, and the average of the interpolated pixel value $V_{i\_1}$ and the pixel value in the current frame $V_{c\_1}$ is greater than the pixel value in the current frame $V_{c\_1}$, which may result in an improper pixel value displayed on the LCD. To solve this problem, the pixel value $V_{c\_1}$ in the current frame needs to be reduced to make the average of the interpolated pixel value $V_{i\_1}$ and the adjusted pixel value in the current frame $V_{c\_1}'$ closer or equal to the pixel value in the current frame $V_{c\_1}$. The adjusted pixel value $V_{c\_1}'$ in the current frame is determined as follows:

$$V_{c\_1}'=V_{c\_1}-(V_{c\_1}-V_{p\_1})*r_{2\_1} \tag{2}$$

In the above formula (2), $r_{2\_1}$ is a second scaling factor and the adjusted pixel value $V_{c\_1}'$ in the current frame is utilized to replace the original pixel value $V_{c\_1}$ in the current frame as the output pixel value in the current frame. If the second scaling factor $r_{2\_1}$ is set at the same value as the first scaling factor $r_{1\_1}$, then the average of the interpolated pixel value $V_{i\_1}$ and the adjusted pixel value $V_{c\_1}'$ in the current frame is equal to the original pixel value $V_{c\_1}$ in the current frame.

In practice, the second scaling factor $r_{2\_1}$ can be a product of the first scaling factor $r_{1\_1}$ and a third scaling factor $r_{3\_1}$. The third scaling factor $r_{3\_1}$ is utilized to adjust the pixel value in the current frame and to further control the luminance of the displayed image.

Figure 2:
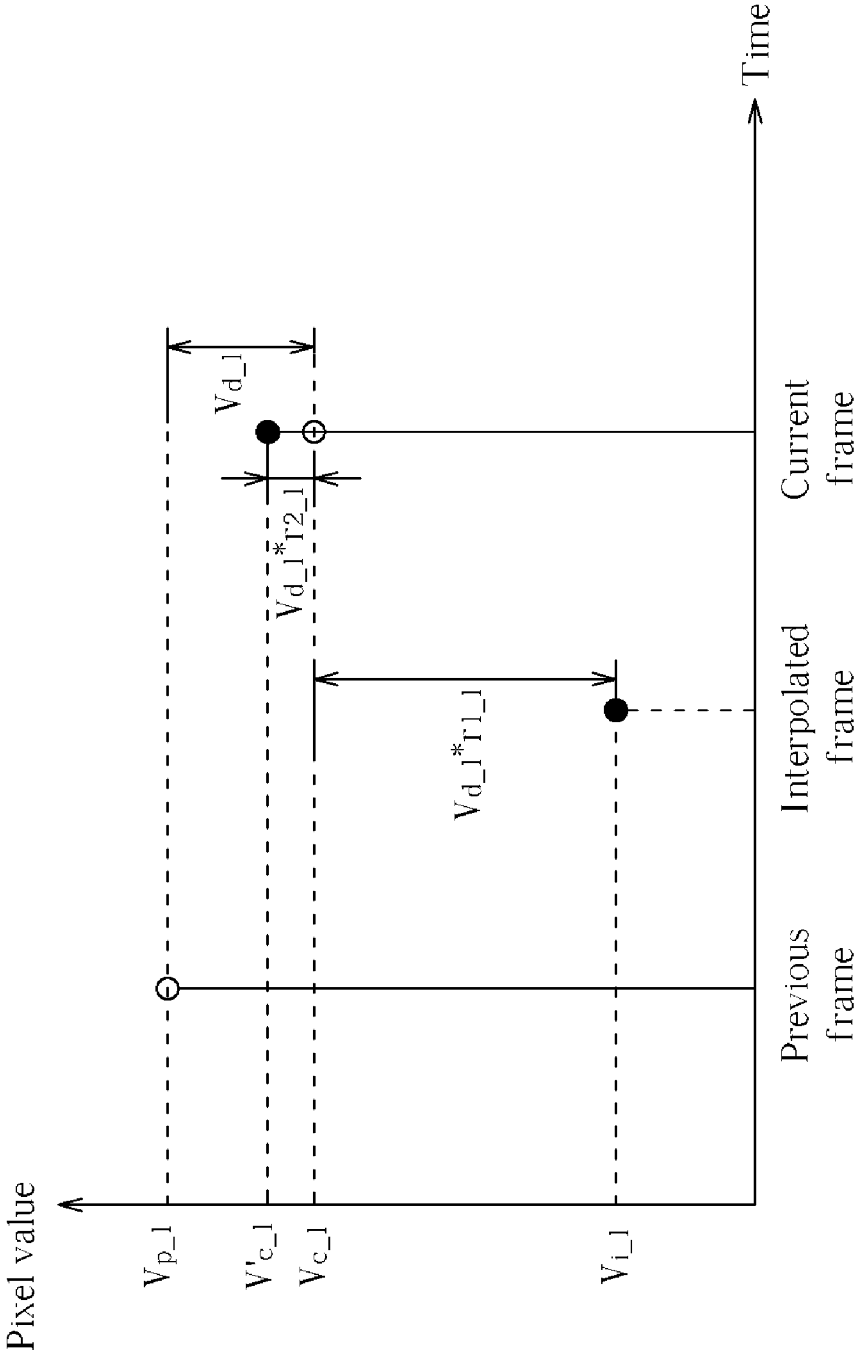
FIG. 2 is a diagram illustrating calculations of the interpolated frame data and the current frame data according to a second embodiment of the present invention.

Please refer to FIG. 2. FIG. 2 is a diagram illustrating calculations for the interpolated frame data and the current frame data according to a second embodiment of the present invention. The calculations for the interpolated pixel value $V_{i\_1}$ and the adjusted pixel value in the current frame $V_{c\_1}'$ shown in FIG. 2 are the same as those shown in FIG. 1, but applied to the condition where the pixel value in the current frame $V_{c\_1}$ is lower than the pixel value $V_{p\_1}$ in the previous frame. As shown in FIG. 2, the pixel value $V_{c\_1}$ in the current frame is lower than the pixel value $V_{p\_1}$ in the previous frame, and the interpolated pixel value $V_{i\_1}$ is therefore lower than the pixel value $V_{c\_1}$ in the current frame. In this embodiment, the greater pixel value difference between the pixel value in the previous frame $V_{c\_1}$ and an interpolated pixel value $V_{i\_1}$ indicates that the target pixel is operating similar to an LCD overdrive method.

Additionally, in this embodiment, the adjusted pixel value in the current frame $V_{c\_1}'$ is set to be greater than the pixel value $V_{c\_1}$ in the current frame, so as to make the average of the interpolated pixel value $V_{i\_1}$ and the pixel value $V_{c\_1}$ in the current frame closer or equal to the original pixel value in the current frame $V_{c\_1}$.

Figure 3:
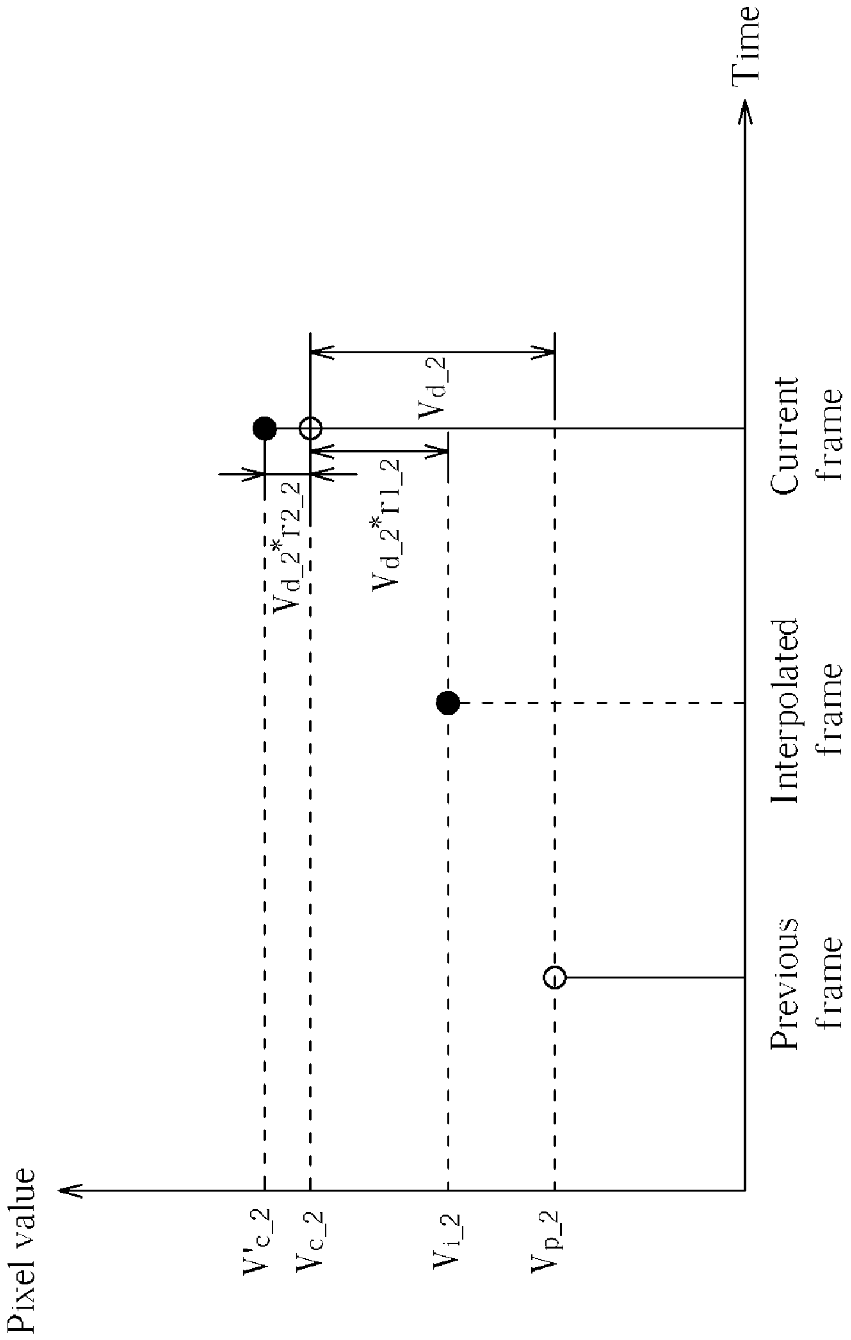
FIG. 3 is a diagram illustrating calculations of the interpolated frame data and the current frame data according to a third embodiment of the present invention.

Please refer to FIG. 3. FIG. 3 is a diagram illustrating calculations for an interpolated pixel value $V_{i\_2}$ and an adjusted pixel value in a current frame $V_{c\_2}'$ according to a third embodiment of the present invention. As shown in FIG. 3, for a given target pixel, the interpolated pixel value $V_{i\_2}$ in an interpolated frame is the difference between a pixel value $V_{c\_2}$ in the current frame and a first adjusting value. Additionally, the first adjusting value is a product of a first scaling factor $r_{1\_2}$ and a pixel value difference $V_{d\_2}$ between the pixel value $V_{c\_2}$ in the current frame and a pixel value $V_{p\_2}$ in the previous frame. The interpolated pixel value $V_{i\_2}$ is determined as follows:

$$V_{i\_2}=V_{c\_2}-(V_{c\_2}-V_{p\_2})*r_{1\_2} \qquad (3)$$

For the given target pixel shown in FIG. 3, the pixel value $V_{c\_2}$ in the current frame is greater than the pixel value $V_{p\_2}$ in the previous frame. The interpolated pixel value $V_{i\_2}$ is between the pixel value $V_{c\_2}$ in the current frame and the pixel value $V_{p\_2}$ in the previous frame. In this embodiment, the interpolated pixel value $V_{i\_2}$ is in the middle of the pixel value $V_{C\_2}$ in the current frame and the pixel value $V_{p\_2}$ in the previous frame, and the displayed image becomes smoother as a result.

However, the average of the interpolated pixel value $V_{i\_2}$ and the pixel value $V_{c\_2}$ in the current frame still may be different from the pixel value $V_{c\_2}$ in the current frame. Therefore, the pixel value $V_{c\_2}$ in the current frame needs to be adjusted, and the adjusted pixel value $V_{c\_2}'$ in the current frame is determined as follows:

$$V_{c\_2}'=V_{c\_2}+(V_{c\_2}-V_{p\_2})*r_{2\_2} \qquad (4)$$

In the above formula (4), $r_{2\_2}$ is a second scaling factor, and the adjusted pixel value $V_{c\_2}'$ in the current frame is utilized to replace the original pixel value $V_{c\_2}$ in the current frame to act as the output pixel value in the current frame. Similarly, if the second scaling factor $r_{2\_2}$ is set as the same value as the first scaling factor $r_{1\_2}$, the average of the interpolated pixel value $V_{i\_2}$ and the adjusted pixel value $V_{c\_2}'$ in the current frame is equal to the pixel value in the current frame $V_{c\_2}$.

In practice, the second scaling factor $r_{2\_2}$ can be a product of the first scaling factor $r_{i\_2}$ and a third scaling factor $r_{3\_2}$. The third scaling factor $r_{3\_2}$ is utilized to adjust the pixel value in the current frame and to further control the luminance of the image.

Figure 4:
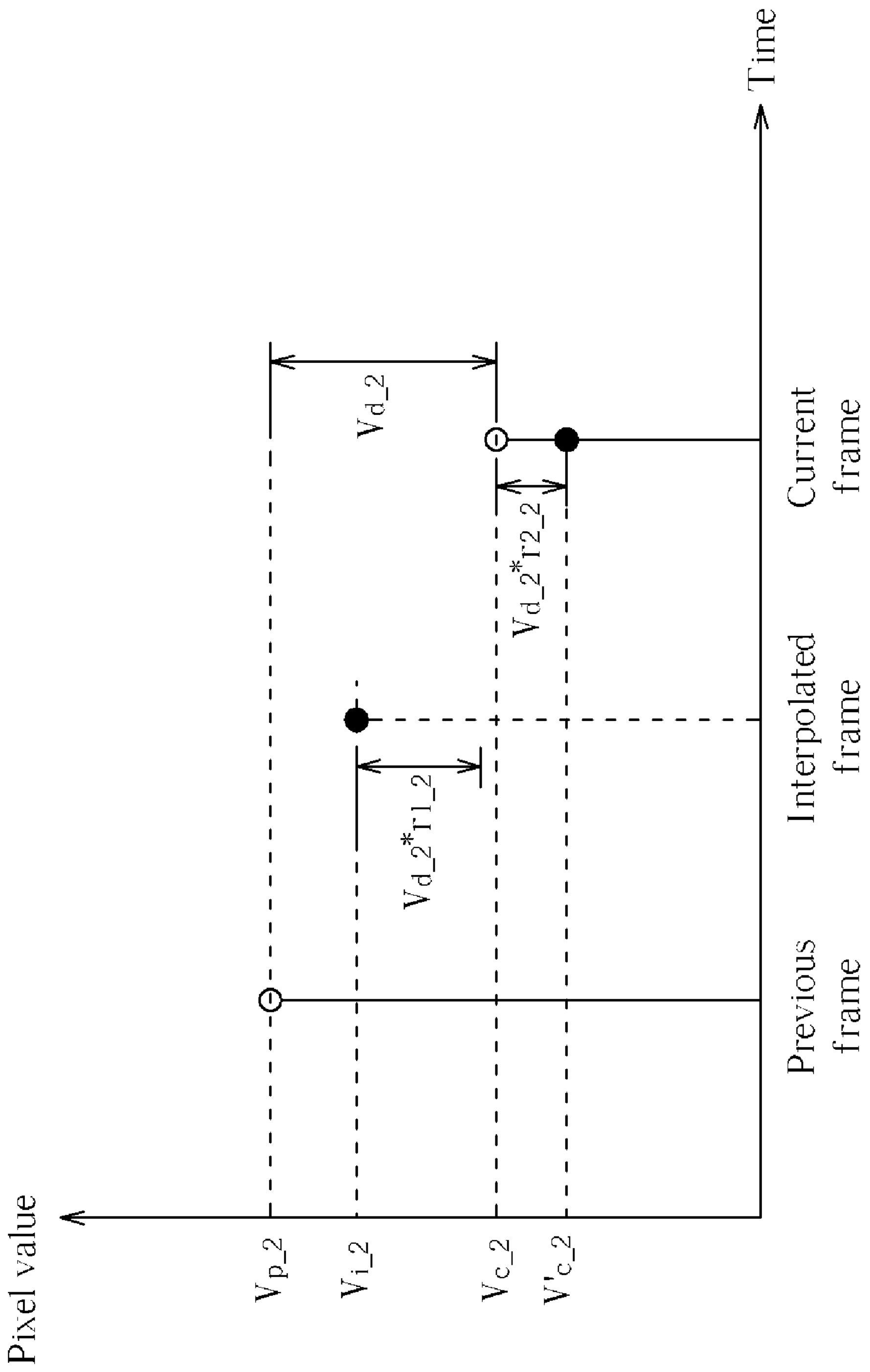
FIG. 4 is a diagram illustrating calculations of the interpolated frame data and the current frame data according to a fourth embodiment of the present invention.

Please refer to FIG. 4. FIG. 4 is a diagram illustrating calculations for the interpolated frame data and the current frame data according to a fourth embodiment of the present invention. The calculations for the interpolated pixel value $V_{i\_2}$ and the adjusted pixel value $V_{c\_2}'$ in the current frame shown in FIG. 4 are the same as those shown in FIG. 3 but applied to a condition whereby the pixel value in the current frame is lower than the pixel value in the previous frame. Further description is omitted here for brevity.

Figure 5:
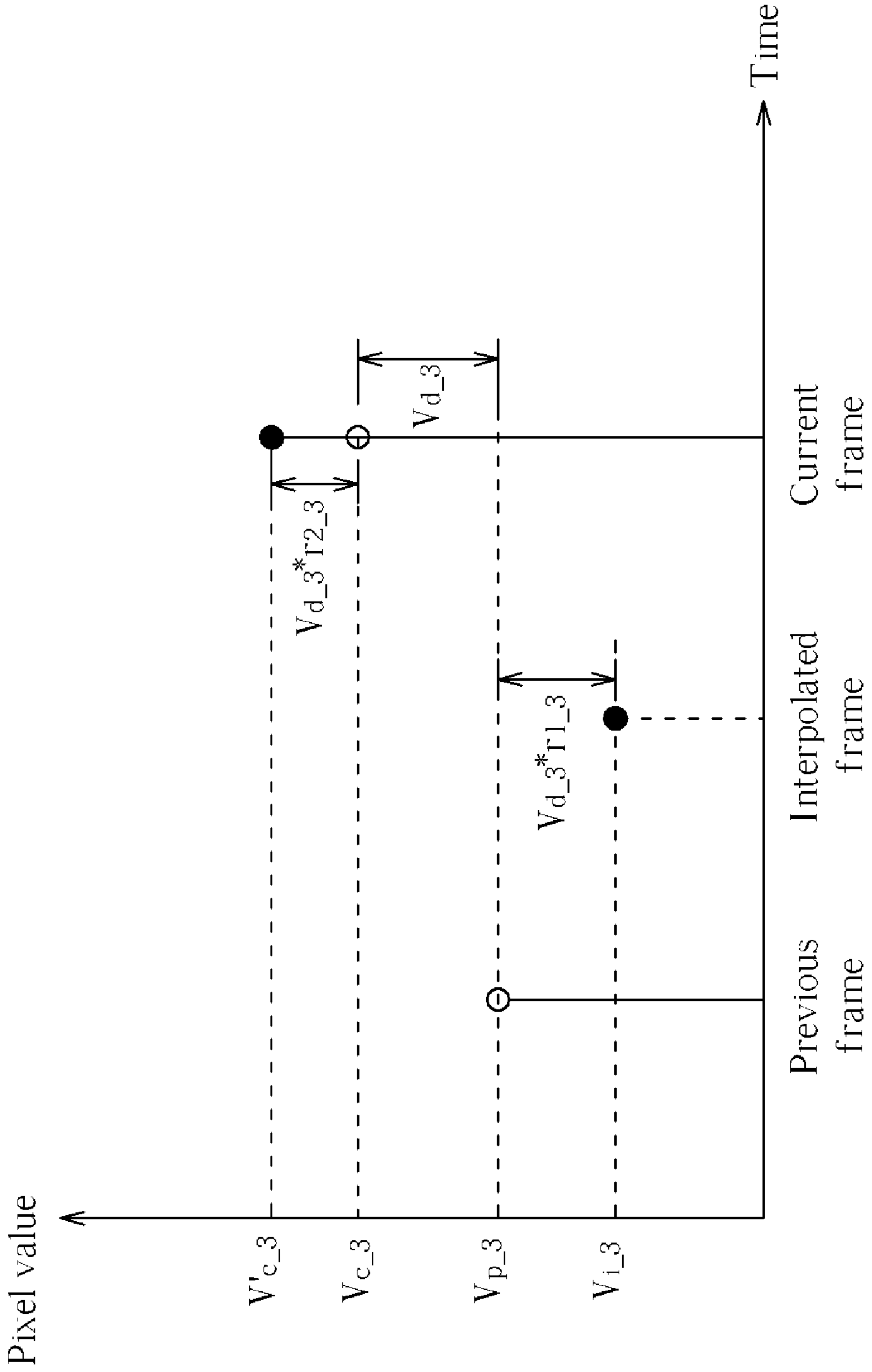
FIG. 5 is a diagram illustrating calculations of the interpolated frame data and the current frame data according to a fifth embodiment of the present invention.

Please refer to FIG. 5. FIG. 5 is a diagram illustrating calculations for an interpolated pixel value $V_{i\_3}$ and an adjusted pixel value $V_{c\_3}'$ in a current frame according to a fifth embodiment of the present invention. As shown in FIG. 5, for a given target pixel, the interpolated pixel value $V_{i\_3}$ in an interpolated frame is set by a pixel value $V_{c\_3}$ in a previous frame less a first adjusting value. Additionally, the first adjusting value is a product of a first scaling factor $r_{i\_3}$ and a pixel value difference $V_{d\_3}$ between the pixel value $V_{c\_3}$ in the current frame and a pixel value $V_{p\_3}$ in a previous frame. The interpolated pixel value $V_{i\_3}$ is determined as follows:

$$V_{i\_3}=V_{p\_3}-(V_{c\_3}-V_{p\_3})*r_{1\_3} \qquad (5)$$

As shown in FIG. 5, the pixel value $V_{c\_3}$ in the current frame is greater than pixel value $V_{p\_3}$ in the previous frame; therefore, the interpolated pixel value $V_{i\_3}$ is lower than the pixel value $V_{c\_3}$ in the previous frame.

However, the above-mentioned interpolated pixel value $V_{i\_3}$ is lower than the pixel value $V_{p\_3}$ in the current frame, and is also much lower than the pixel value $V_{c\_3}$ in the current frame. Therefore, the average of the interpolated pixel value $V_{i\_3}$ and the pixel value $V_{c\_3}$ in the current frame would also be much lower than the pixel value $V_{c\_3}$ in the current frame, which may result in an improper pixel value displayed from the LCD. To solve this problem, the pixel value $V_{c\_3}$ in the current frame needs to be increased to make the average of the interpolated pixel value $V_{i\_3}$ and the pixel value $V_{c\_3}$ in the current frame closer or equal to the original pixel value $V_{c\_3}$ in the current frame. The adjusted pixel value $V_{c\_3}'$ in the current frame is calculated as follows:

$$V_{c\_3}'=V_{c\_3}+(V_{c\_3}-V_{p\_3})*r_{2\_3} \qquad (6)$$

In the above formula (6), $r_{2\_3}$ is a second scaling factor and the adjusted pixel value $V_{c\_3}'$ in the current frame is utilized to replace the original pixel value $V_{c\_3}$ in the current frame to act as the output pixel value in the current frame. If the second scaling factor $r_{2\_3}$ is set as the same value as the first scaling factor $r_{1\_3}$, the average of the interpolated pixel value $V_{i\_3}$ and the adjusted pixel value $V_{c\_3}'$ in the current frame will be equal to the pixel value $V_{c\_3}$ in the current frame.

In practice, the second scaling factor $r_{2\_3}$ can be a product of the first scaling factor $r_{1\_3}$ and a third scaling factor $r_{3\_3}$. The third scaling factor $r_{3\_3}$ is utilized to adjust the pixel value in the current frame and to further control the luminance of the image.

According to the calculations for the interpolated pixel value $V_{i\_3}$ and the adjusted pixel value $V_{c\_3}'$ in the current frame, the difference between the interpolated pixel value $V_{i\_3}$ and the adjusted pixel value $V_{c\_3}'$ in the current frame is greater than the difference between the pixel values $V_{p\_3}$ and $V_{c\_3}$ in the previous and current frames, respectively. That is, the change in the driving voltage of the target pixel becomes greater, thereby driving the liquid crystal to rotate more rapidly, resulting in a faster response time.

Figure 6:
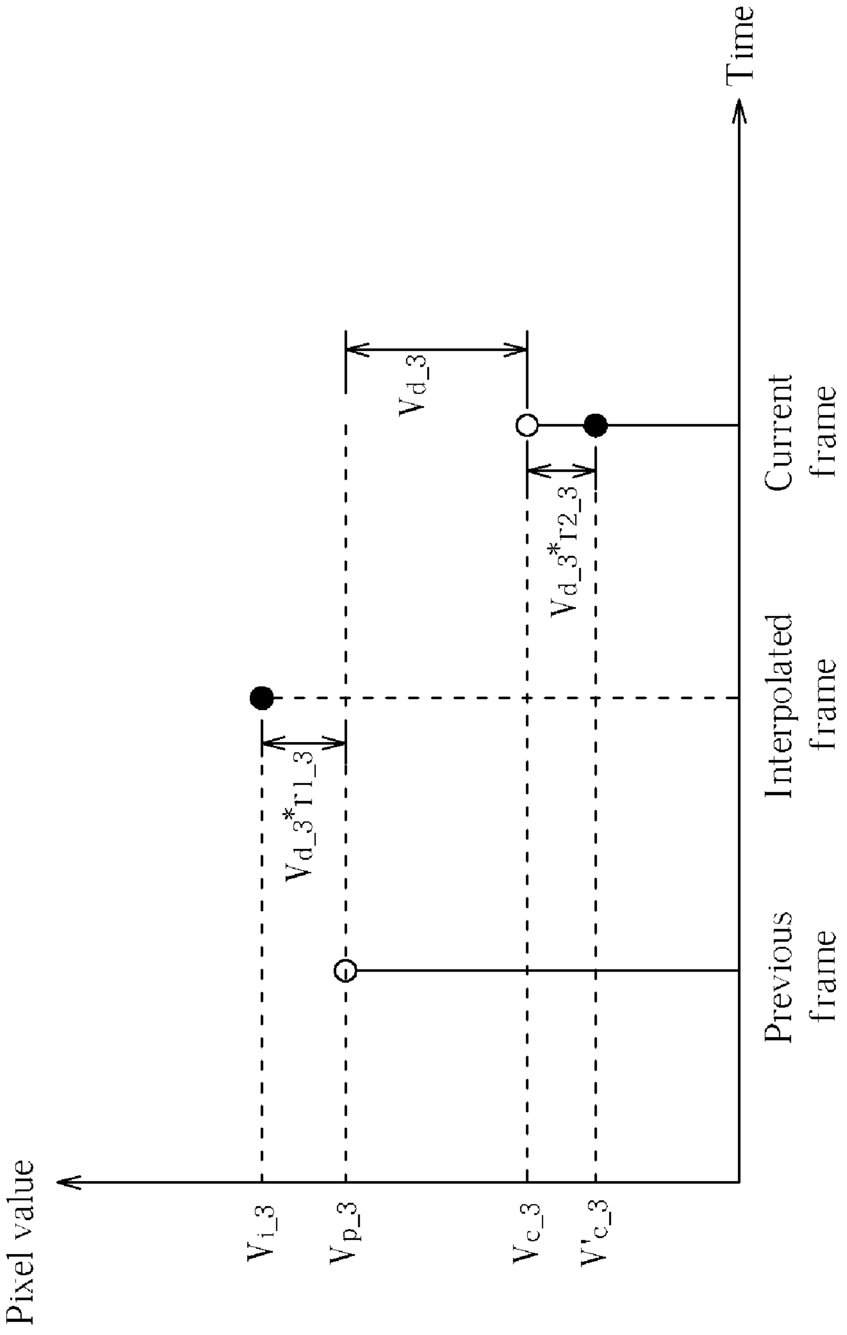
FIG. 6 is a diagram illustrating calculations of the interpolated frame data and the current frame data according to a sixth embodiment of the present invention.

Please refer to FIG. 6. FIG. 6 is a diagram illustrating calculations for the interpolated frame data and the current frame data according to a sixth embodiment of the present invention. The calculations for the interpolated pixel value $V_{i\_3}$ and the adjusted pixel value $V_{c\_3}'$ in the current frame shown in FIG. 6 are the same as the calculations shown in FIG. 5, but applied to the scenario where the pixel value $V_{c\_3}$ in the current frame is lower than the pixel value $V_{p\_3}$ in the previous frame.

For the given target pixel shown in FIG. 6, the pixel value $V_{c\_3}$ in the current frame is lower than the pixel value $V_{p\_3}$ in the previous frame while the interpolated pixel value $V_{i\_3}$ is greater than the pixel value $V_{p\_3}$ in the previous frame, and the adjusted pixel value $V_{c\_3}'$ in the current frame is lower than the pixel value $V_{c\_3}$ in the current frame. Thus, the difference between the interpolated pixel value $V_{i\_3}$ and the adjusted pixel value $V_{c\_3}'$ in the current frame is greater than the difference between the pixel value $V_{p\_3}$ in the previous frame and the original pixel value $V_{c\_3}$ in the current frame, resulting in fast response time.

According to the above-mentioned embodiments of the present invention, the interpolated pixel value and the adjusted pixel value in the current frame are determined by the formulas with fixed parameters (i.e., the first scaling factor $r_{1\_1}$, $r_{1\_2}$, $r_{1\_3}$ and the second scaling factor $r_{2\_1}$, $r_{2\_2}$, $r_{2\_3}$). However, for the varying pixel values in the previous and current frames, the appropriate interpolated pixel values and the adjusted pixel values in the current frame may not be simply determined by the formula with fixed parameters. To solve this problem, the adjusting values can be determined according to a look-up table.

Figure 7:
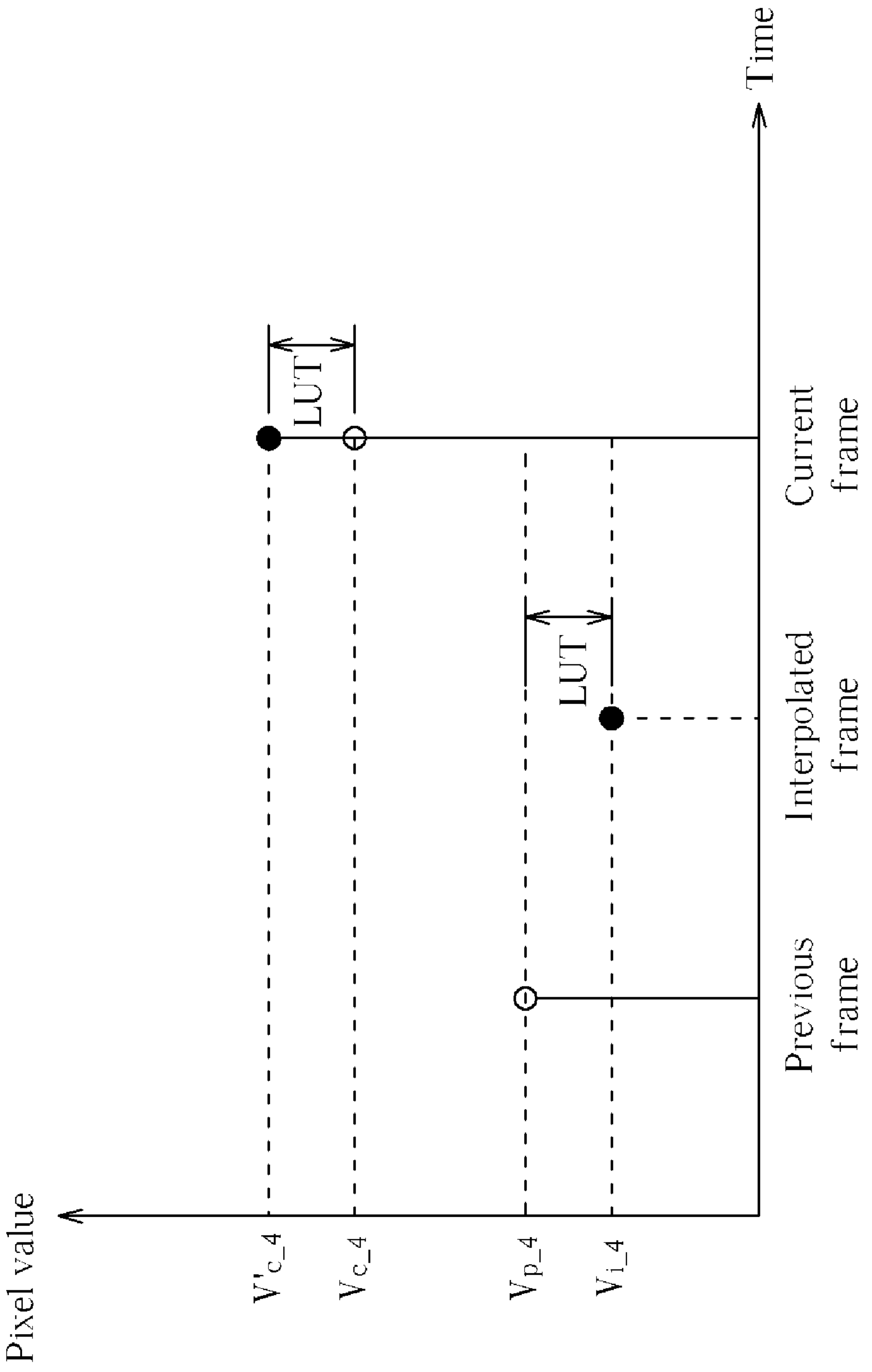
FIG. 7 is a diagram illustrating calculations of the interpolated frame data and the current frame data according to a seventh embodiment of the present invention.

Please refer to FIG. 7. FIG. 7 is a diagram illustrating calculations of an interpolated pixel value $V_{i\_4}$ and an adjusted pixel value $V_{c\_4}'$ in a current frame according to a seventh embodiment of the present invention. As shown in FIG. 7, for a given target pixel, the interpolated pixel value $V_{i\_4}$ in an interpolated frame is a sum of a pixel value $V_{p\_4}$ in a previous frame and a first adjusting value. The first adjusting value is determined via a look-up table LUT having a plurality of entries. Each entry of the look-up table LUT has two parameters $V_{p\_4}$ and $V_{c\_4}$ serving as index parameters, where $V_{p\_4}$ is a pixel value in the previous frame and $V_{c\_4}$ is a pixel value in the current frame. The interpolated pixel value $V_{i\_4}$ is determined as follows:

$$V_{i\_4}=V_{p\_4}+\mathrm{LUT}(V_{p\_4},V_{c\_4}) \quad (7)$$

As shown in FIG. 7 for the given target pixel, the pixel value $V_{c\_4}$ in the current frame is greater than the pixel value $V_{p\_4}$ in the previous frame. The interpolated pixel value can be properly determined according to the look-up table to achieve better image quality. Additionally, an adjusted pixel value in the current frame $V_{c\_4}'$ can be determined using the look-up table similarly:

$$V_{c\_4}'=V_{c\_4}-\mathrm{LUT}(V_{p\_4},V_{c\_4}) \quad (8)$$

The adjusted pixel value $V_{c\_4}'$ in the current frame is utilized to replace the pixel value in the current frame $V_{c\_4}$, in order to make the average of the interpolated pixel value $V_{i\_4}$ and the adjusted pixel value $V_{c\_4}'$ in the current frame equal to the original pixel value in the current frame $V_{c\_4}$.

Figure 8:
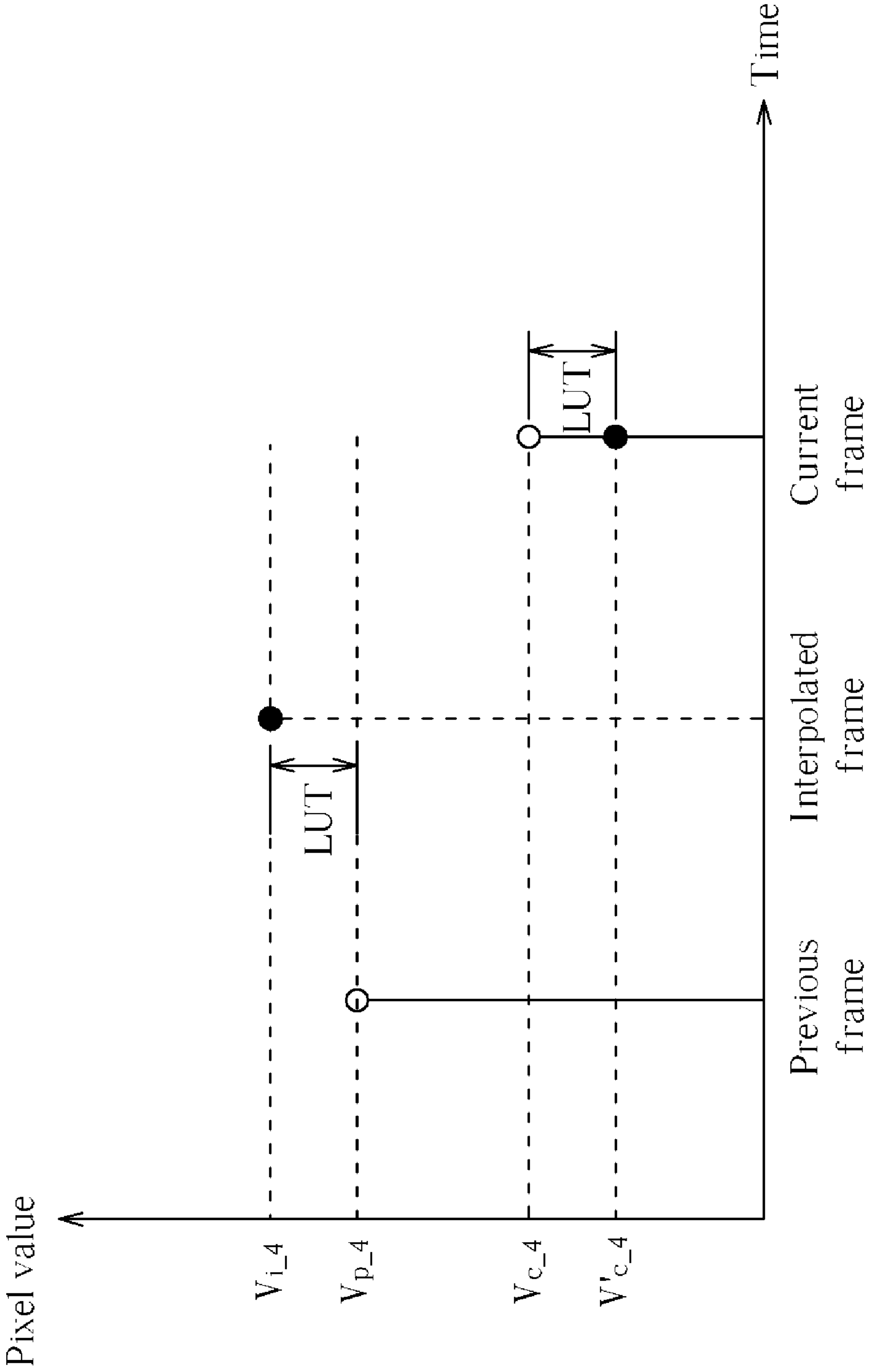
FIG. 8 is a diagram illustrating calculations of the interpolated frame data and the current frame data according to an eighth embodiment of the present invention.

Please refer to FIG. 8. FIG. 8 is a diagram illustrating calculations for the interpolated frame data and the current frame data according to an eighth embodiment of the present invention. The calculations for the interpolated pixel value $V_{i\_4}$ and the adjusted pixel value $V_{c\_4}'$ in the current frame shown in FIG. 8 are the same as those shown in FIG. 7, but applied in a scenario where the pixel value in the current frame is lower than the pixel value in the previous frame. Similarly, the interpolated pixel value $V_{i\_4}$ and the adjusted pixel value $V_{c\_4}'$ are both determined by using the look-up table LUT. Further description is omitted here for brevity.

Those skilled in the art will readily observe that numerous modifications and alterations of the device and method may be made while retaining the teachings of the invention.

What is claimed is:

1. A method of frame interpolation for frame rate up-conversion, comprising:

determining a first adjusting value and a second adjusting value according to a target pixel in a first frame and a second frame;

determining an interpolated pixel value of the target pixel in an interpolated frame between the first frame and the second frame according to the first adjusting value and a pixel value of the target pixel in the first and second frames, wherein the interpolated pixel value of the target pixel is calculated according to the equation $V_{i\_1}=V_{c\_1}+(V_{c\_1}-V_{p\_1})*r_{i\_1}$ where $V_{i\_1}$ represents the interpolated pixel value of the target pixel, $V_{c\_1}$ represents the pixel value of the target pixel in the second frame, $V_{p\_1}$ represents the pixel value of the target pixel in the first frame, $r_{i\_1}$ represents a first scaling factor, and the first adjusting value is equal to $(V_{c\_1}-V_{p\_1})*r_{i\_1}$ and adjusting a pixel value of the target pixel in the second frame according to the second adjusting value, wherein the second adjusting value is equal to $(V_{c\_1}-V_{p\_1})*r_{2\_1}$ where $r_{2\_1}$ represents a second scaling factor, and the pixel value of the target pixel in the second frame is calculated according to the equation $V_{c\_1}'=V_{c\_1}-(V_{c\_1}-V_{p\_1})*r_{2\_1}$ where $V_{c\_1}'$ represents an adjusted pixel value of the second frame.

* * * * *